United States Patent
Harmer et al.

[11] Patent Number: 5,135,141
[45] Date of Patent: Aug. 4, 1992

[54] MOLDED PLASTIC GARMENT HANGER WITH TWO PART PLASTIC INDICIA TAB

[75] Inventors: Roland G. Harmer, Centereach; Olaf F. Olk, Hauppauge; Stanley Gouldson, Northport, all of N.Y.

[73] Assignee: Plasti-form Enterprises, Inc., Deer Park, N.Y.

[21] Appl. No.: 706,779

[22] Filed: May 29, 1991

[51] Int. Cl.⁵ .................. A47G 25/32; G09F 3/00
[52] U.S. Cl. ........................... 223/85; 223/92; 223/95; 223/DIG. 4; 40/322
[58] Field of Search .......... 223/88, 85, 92, 95, 223/DIG. 4; 211/113; 40/322, 616

[56] References Cited

U.S. PATENT DOCUMENTS

| | | | |
|---|---|---|---|
| 1,321,926 | 11/1919 | Landry | 40/322 |
| 1,348,952 | 8/1920 | Landry | 40/322 |
| 1,389,266 | 8/1921 | Newton | 40/322 |
| 2,166,492 | 7/1939 | Harvey | 223/94 |
| 2,801,036 | 7/1957 | Klein | 223/92 |
| 3,024,953 | 3/1962 | O'Keefe | 223/88 |
| 4,006,547 | 2/1977 | Samuels et al. | 40/322 |
| 4,017,990 | 4/1977 | Garrison | 223/85 X |
| 4,115,940 | 9/1978 | Phillips | 40/322 |
| 4,137,661 | 2/1979 | Johansson | 40/322 |
| 4,623,079 | 11/1986 | Tendrup et al. | 223/85 |
| 4,629,102 | 12/1986 | Tendrup et al. | 223/85 |
| 4,886,195 | 12/1989 | Blanchard | 223/85 |
| 4,967,500 | 11/1990 | Bredeweg | 40/322 |
| 5,056,248 | 10/1991 | Blanchard | 223/85 X |

FOREIGN PATENT DOCUMENTS

| | | | |
|---|---|---|---|
| 6716411 | 12/1966 | Netherlands | 40/322 |
| 2209737 | 5/1989 | United Kingdom . | |

Primary Examiner—Werner H. Schroeder
Assistant Examiner—Bibhu Mohanty
Attorney, Agent, or Firm—Scully, Scott, Murphy & Presser

[57] ABSTRACT

A molded plastic garment hanger constituted from two materials which are fused and bonded to form a composite hanger. Also disclosed is a method and apparatus for the two-step or co-injection molding of plastic materials for the formation of the plastic garment hanger construction. The plastic garment hanger incorporates an insert consisting of a second plastic material adapted to have indicia and/or logo means molded therein, and which insert may be fused to the hanger structure so as to form a bond with the first plastic material constituting the basic garment hanger.

9 Claims, 2 Drawing Sheets

MOLDED PLASTIC GARMENT HANGER WITH TWO PART PLASTIC INDICIA TAB

BACKGROUND OF THE INVENTION

The present invention relates to a plastic garment hanger construction, and more particularly, pertains to a molded plastic garment hanger constituted from two materials which are fused and mechanically bonded to form a composite hanger. Moreover, the foregoing, the invention also relates to a novel method and apparatus for the two-step or co-injection molding of plastic materials for the formation of the plastic garment hanger construction.

In industry, particularly such as the garment manufacturing industry, plastic hangers garment are widely employed for the purpose of shipping and displaying garments, such hangers frequently being of the inexpensive ship-on type whereby the garment is shipped from the manufacturer or wholesaler to the retailer while suspended from the hanger. Generally, such garment hangers are of an inexpensive single-piece or unitary molded plastic structure which is adapted to be either discarded at the time of sale, returned to the garment manufacturer or provided to a customer free of charge in conjunction with the purchase of the garment suspended therefrom.

Garment hangers of that type may either be simply constructed as unitary molded plastic structures incorporating a central hook portion adapted to be suspended from a suitable support, such as a garment rack or the like, and with a hanger body portion having arms extending in opposite coplanar directions from the base of the hook portion so as to facilitate a garment to be suspended therefrom. When needed for a specific use, the opposite or distal ends of the body portion or arms may be formed with suitable grips or clip members to enable the gripping attachment of various kinds of garments thereto, such as underwear, slips, brassieres, multiple garments, and the like.

Quite frequently, the garment hangers are molded so as to incorporate various indicia or logos, which may be representative of the garment manufacturer or designer, or possibly the retail establishment, to provide a form of advertisement and to also identify the origin of the garment being suspended therefrom. Hereby, such embossing which is molded into the hanger may also be imprinted therein so as to provide various color contrasts provided through molded raised or recessed surfaces representative of a logo, advertisement, or the like as mentioned hereinbefore.

However, upon occasion, it may be advantageous to be able to mold a plastic garment hanger structure of that type in the absence of the basic hanger construction incorporating such logo or indicia, the presence of which would render the garment hanger primarily suitable for only a specific manufacturer, garment designer or retailer. Consequently, in order to impart a universal approach to the manufacture of garment hangers incorporating such indicia on the hangers, it may be advantageous that the logo or various information be incorporated into the garment hanger in the form of a separate element which is either permanently or detachably fastened to the basic hanger structure, and which enables such indicia or logo to be applied to the hanger subsequent to or concurrent with the manufacture of the basic hanger structure.

DISCUSSION OF THE PRIOR ART

Blanchard U.S. Pat. No. 4,886,195 discloses a plastic garment hanger of a basically unitary construction wherein garment size identification structure is molded into the hanger, such as in the shape of a flat surface molded into the hook portion of the hanger. Although this provides for a suitable provision of indicia, such as garment size identification or of a logo and the like, the hanger would not be readily employable for garments produced by either different manufacturers or for garments of different sizes. Consequently, the garment hanger is limited to its use for a specific application and/or garment type or size.

Samuels, et al. U.S. Pat. No. 4,006,547 discloses a garment hanger in which indicia means are attachable to the hanger body in the form of tabs or the like which can be removed from the hanger at the point of sale, or replaced by other indicia-incorporating structure when it is required to employ the garment hanger for different garment types.

Similarly, Phillip U.S. Pat. No. 4,115,940 discloses a molded plastic garment hanger in which clips or tabs bearing specified indicia may be detachably fastened to the hanger structure.

Accordingly, in order to improve upon the plastic hangers which are currently available in the industry, and which incorporate integral structure bearing indicia or logos for the purpose of identifying manufacturers, designers, retailers or the like by having such information molded or embossed into the primary hanger construction, the invention contemplates the provision of molded plastic garment hangers incorporating at least at one suitable location on the hanger, a frame-like enclosure, with a through-aperture of predetermined size and configuration integrally molded with the basic hanger structure, and wherein an insert from a second or separate plastic material is adapted to be molded into the aperture of the enclosure and having the specified indicia, such as a logo or other suitable legends molded therein. The composite garment hangers which are thus formed from two separate materials, may be constituted from two plastic materials of the same color and/or type of plastic, or from different kinds of plastic materials and which, if desired, may be imparted different colors to provide a decorative effect. The second plastic material for the insert which is molded into the frame-like enclosure and which has the logo impressed or molded therein, is generally produced in the same mold for producing the basic hanger structure through a co-injection method, subsequently to the initial molding and cooling of the basic hanger structure so as to cause the insert to fuse and mechanically bond with the contacting surfaces within the enclosure molded into the plastic material for the hanger. This imparts a versatility to the construction and utilization of such garment hangers inasmuch as a single mold with a movable core can be employed for forming the entire composite plastic garment hanger construction, and the mold may be modified with regard to the formation of the insert portion adapted to be received within the enclosure, so as to enable the hanger to be individualized concerning the incorporation of indicia representative manufacturers, designers and/or retail establishments at a minimum cost and effort.

For this purpose, the invention also contemplates a two-step molding procedure or, in essence, a co-injection plastic molding method whereby plastic materials of different types and/or colors may be readily employed so as to have a first plastic material of a specified type and color form the basic hanger structure, cooled to some extent within the mold so as to solidify, and thereafter a mold core is movable into a position in communication with an inlet for a further or second plastic material which may be either of the same color and/or type as the first plastic material or, possibly of a different color and/or material type, and in which the second plastic material forms the insert which is fused and mechanically bonded with the plastic material of the basic hanger structure so as to provide for a permanent connection therebetween. However, it may also be readily appreciated that, upon the manufacture of larger quantities of such garment hangers, in the event that appreciable numbers of such hangers bearing a specific indicia or logo cannot be employed, it may be possible to simply punch or knock out the insert by applying lateral mechanical pressure thereto, and thus facilitate removal of the undesired logo-bearing insert from the hanger without inherently damaging the basic hanger construction itself, thereby enabling such garment hangers to be generically employed with other types and makes of garments.

Basically, numerous kinds of apparatus and methods for molding two-component plastic materials; in essence, by means of a two-step or co-injection process are known in the technology; however, these have not been specifically applied to the production of a two-component or composite plastic garment hanger of the type considered herein.

In essence, Neumeister U.S. Pat. No. 4,416,602 discloses an injection molding apparatus for manufacturing articles from different types of plastic materials, in which a first plastic material is injected into a mold to form a frame member or the like, and thereafter subsequent to cooling and solidifying of the molten plastic material, a second plastic material is injected into the cavity of the mold so as to form an insert within an aperture of the frame member provided by the first plastic material, thereby fuzing the plastic materials and forming a mechanical bond therebetween.

Similar types of molding apparatus and methods of that kind are disclosed in various patent publications, representative of which are Schomblond U.S. Pat. No. 4,711,621 disclosing a mold for producing composite bodies from different plastic materials; Hemery U.S. Pat. No. 4,335,068 and Bullard, et al. U.S. Pat. No. 3,577,596.

SUMMARY OF THE INVENTION

Accordingly, it is a basic object of the present invention to provide a molded plastic garment hanger which incorporates an insert consisting of a second plastic material adapted to have indicia and/or logo means molded therein, and which insert may be fused to the hanger structure so as to form a mechanical bond with the first plastic material constituting the basic garment hanger.

Another object of the present invention is to provide a two-component plastic garment hanger adapted to be molded through a single co-injection molding process, whereby an insert which may be of a similar color and/or plastic material, as the basic hanger construction, or alternatively, of a different coloring and/or type of plastic material, is fused within a mold to the material of the basic hanger construction so as to form a mechanical bond therebetween.

Another object of the present invention is to provide a mold for the co-injection of at least two plastic materials to form a composite molded plastic garment hanger structure.

A more specific object resides in the provision of a plastic mold of the type described herein, in which a second plastic material is molded into a frame-like enclosure formed from the first plastic material producing the basic hanger construction so as to be fused thereto and forming a mechanical bond therewith.

Yet another object of the present invention is to provide a method for the co-injection molding of a plastic garment hanger construction which is constituted from a composite plastic material.

BRIEF DESCRIPTION OF THE DRAWINGS

The foregoing and other objects of the invention may now be more readily ascertained from the following detailed description of preferred embodiments thereof, taken in conjunction with the accompanying drawings; in which.

DETAILED DESCRIPTION

Figure 1:
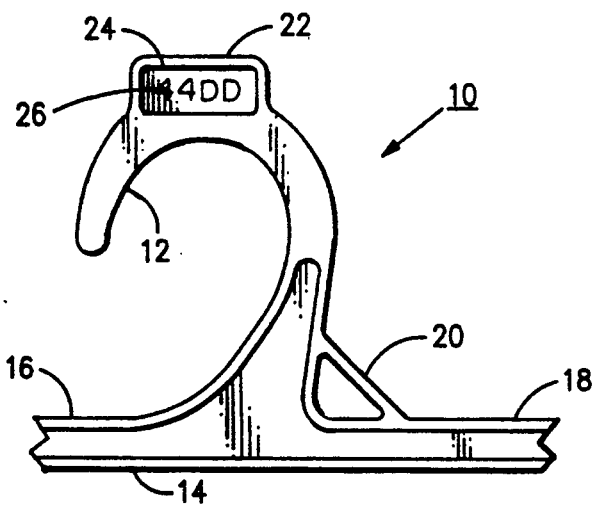
FIG. 1 illustrates a fragmentary side view of a molded plastic garment hanger incorporating an insert pursuant to the inventive concept.

Referring now in detail to the drawings, and particularly the hanger construction as shown in FIG. 1, there is illustrated a partial or fragmentary side view of a molded plastic garment hanger 10 having a central hook portion 12 which is integrally molded with hanger body 14, the latter of which includes a pair of coplanar oppositely directed arms 16 and 18 for suspending one or more garments, as is well known in industry. The distal ends of each of the arms 16 and 18 may, if desired, be equipped with suitable garment gripping or clip structure, for example, as disclosed in Tendrup, et al. U.S. Pat. No. 4,623,079, or alternatively, may be of a simple rounded end configuration to merely permit hanging suspension of a garment rather than fastening the garment to the hanger. In order to provide a reinforcement for the hook portion 12, a suitable gusset or flange 20 may be molded into the hanger proximate the juncture between base of the hanger portion 12 and the arm 18 of the hanger body 14. This will impart an enhanced degree of strength against bending of the hook portion in the plane of the body 14 under the weight of a supported garment.

Pursuant to the inventive structure of the hanger, as shown in the embodiment of FIG. 1, the upper end of the hook portion 12 has integrally molded thereto a suitable enclosure or frame portion 22 providing an enclosed aperture 24, in this instance, of a generally rectangular configuration. Positioned within the aperture 24 of enclosure 22 is an insert 26 of a plastic material which may either be of the same color and/or type of plastic as that of the basic hanger construction or, alternatively, may be of a different plastic material and/or color to provide a composite hanger structure of a specific decorative nature. The plastic insert 26 is essentially molded into the enclosure 22 so as to fuse with the material of the contacting edge surface of the latter and to thereby form a mechanical bond between the insert 26 and the basic hanger structure 10. Suitable logos and other kinds of indicia may be molded or sized into the insert 26, such as for identifying the garment manufacturer or designer, or the retailer, or may include any other suitable advertising or identifying legends in conformance with the requirements of the retailer or manufacturer of the garments The modified embodiments of the hanger as shown in FIGS. 2 and 3, in which identical or similar elements are identified by the same reference numerals as those in FIG. 1, primarily differ from the former in the location of the enclosure 22 for the insert which is molded into the basic garment hanger construction, and whereby the insert 26 is shown at different positions relative to the hanger hook portion 12 and hanger body 14.

Figure 2:
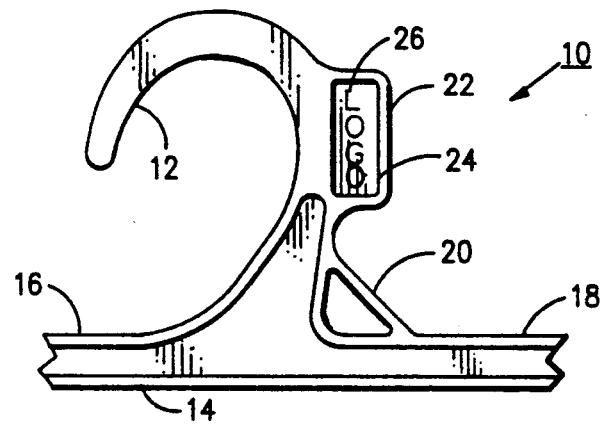
FIG. 2 illustrates an embodiment in a view similar to FIG. 1, showing a modification thereof.

Thus, in FIG. 2, rather than being located at the upper end of the hook portion 12, the enclosure 22, and resultingly insert 26, are formed towards one side of the hook portion and extend coplanarly intermediate the upper end and the juncture of the base of the hook portion with the hanger body 14.

Figure 3:
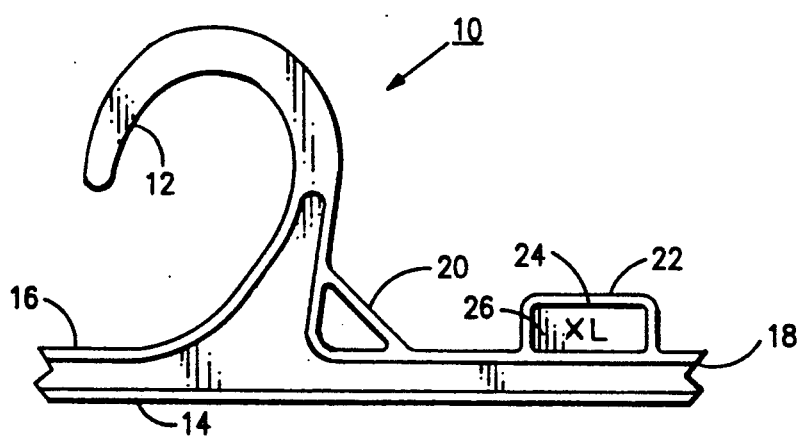
FIG. 3 illustrates an embodiment in a view similar to FIG. 1, showing a further modification thereof.
Figure 4:
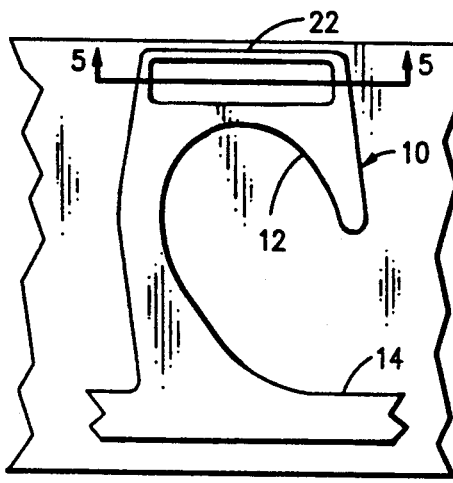
FIG. 4 illustrates a fragmentary schematic plan view of a mold showing the cavity for forming the plastic garment hanger pursuant to the invention.
Figure 5:
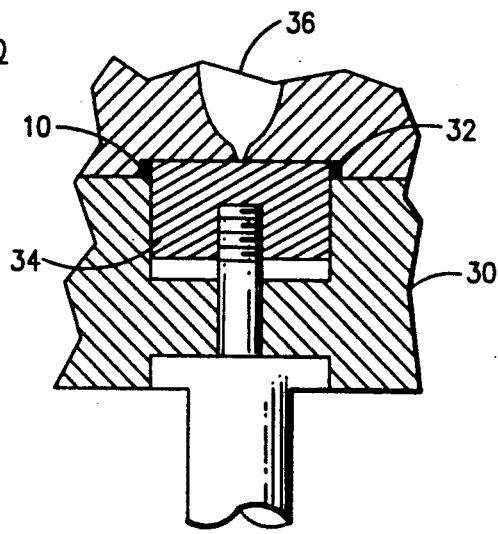
FIG. 5 illustrates a sectional view taken along line 5—5 in FIG. 4.

Similarly, in the embodiment of FIG. 3, rather than being formed on the hook portion 12, the enclosure 22 may be molded onto the hanger body 14, in this instance, onto the arm 18 so as to extend upwardly therefrom in a type of tab structure, and with the insert 26 being fused and mechanically bonded therein as in the previous embodiments.

It is also possible to contemplate providing apertures for receiving inserts 26 in the body of the hanger portion 14 itself; for instance, such as in the region within the base of the hook portion, or at any other suitable location as desired by the needs of a customer for the garment hanger.

The entire composite hanger structure may be molded in a co-injection plastic mold 30, as shown diagrammatically in FIGS. 4 through 7 of the drawings.

Figure 6:
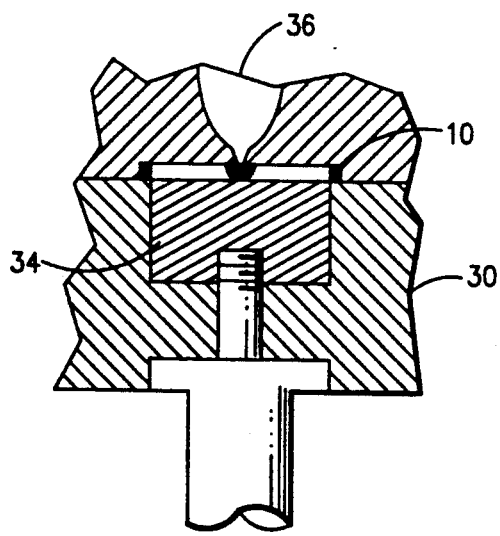
FIG. 6 illustrates a view similar to FIG. 5 showing the mold in a further operative position.
Figure 7:
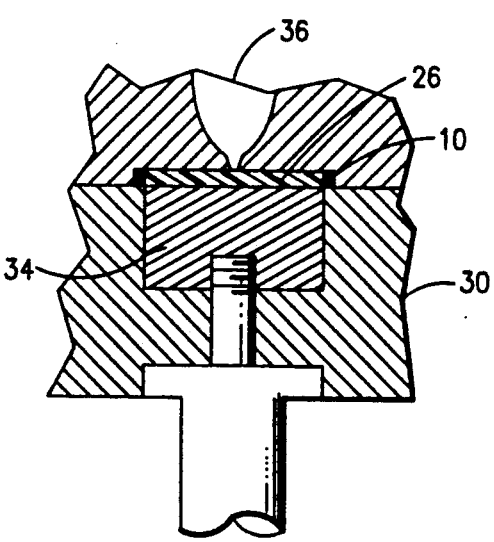
FIG. 7 illustrates a view similar to FIG. 5 showing the mold in the final operative position for forming the composite molded plastic garment hanger.

Hereby, the injection mold 30 includes a mold cavity 32 which is equipped with a movable core 34 to enable a first plastic material in a molten state to be injected therein so as to form the basic hanger construction 10 incorporating the enclosure or frame 22 for an insert 26 which is to be subsequently located therein. After this molding procedure is completed with regard to the injection of the first plastic material into the mold cavity 32 for the basic hanger construction 10, the core 34 is displaced, as shown in FIG. 6, so as to be retracted to close off the infeed for the first plastic material, and a second plastic material is commenced being injected into the mold cavity from a separate injection inlet 36. The second plastic material, as shown in FIG. 7 fills the aperture or pocket formed within the frame 22 when the core is fully retracted and the mold is allowed to cool to produce the insert 26. Hereby, the mold cavity may also be provided with a suitable configuration to permit the concurrent molding of various logo or indicia into or onto the insert 26. Upon opening of the mold subsequent to cooling, the completed composite garment hanger structure is ejected, the mold then closed and readied for the molding of another garment hanger pursuant to the invention.

From the foregoing, it becomes readily apparent that the present invention is directed to an extremely simple composite garment hanger construction, preferably produced in a co-injection mold and through a simple two-step process requiring a minimum amount of effort and expenditure while being versatile in its applications due to its specific structural aspects.

Hereby, the plastic materials which can be employed with the molding method in order to produce the inventive composite molded plastic garment hanger may include, but are not limited to plastic materials such as polystyrene, SAN, ADS, PPO, nylon, polypropylene, polyethylene, PET, polycarbonates, acrylics and PVC, among numerous other plastic compositions, each being provided with different colorings in conformance with the specific demands of the customer.

While there has been shown and described what are considered to be preferred embodiments of the invention, it will, of course, be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

We claim:

1. A molded plastic garment hanger having a centrally located hook portion for suspension from a support, and a body integrally formed with said hook portion so as to extend substantially horizontally from a lower end of said hook portion, said hanger having at least one enclosure having a through-aperture molded therein of specified configuration and size; and an insert for indicia constituted from a second plastic material of a configuration and size commensurate with the aperture of said enclosure molded into said enclosure so as to form a plastic molded bond with the first plastic material of said garment hanger.

2. A garment hanger as claimed in claim 1, wherein said at least one enclosure for said insert is coplanarly molded at an upper end of said hook portion distant from a base portion connecting said hook portion with said hanger body.

3. A garment hanger as claimed in claim 1, wherein said at least one enclosure for said insert is coplanarly molded on an outer side edge of said hook portion intermediate and upper end and base of said hook portion.

4. A garment hanger as claimed in claim 1, wherein said at least one enclosure for said insert is molded on the body of said garment hanger.

5. A garment hanger as claimed in claim 1, wherein said at least one enclosure has a generally rectangular configuration.

6. A garment hanger as claimed in claim 1, wherein said insert is constituted from a plastic material which is dissimilar from the plastic material of said hook portion and hanger body.

7. A garment hanger as claimed in claim 1, wherein said insert and said hook portion and hanger body consist of similar plastic materials.

8. A garment hanger as claimed in claim 1, wherein said insert has a coloring which differs from the coloring of said hook portion and hanger body.

9. A garment hanger as claimed in claim 1, wherein said insert has indicia imprinted, embossed or molded thereon.

* * * * *

UNITED STATES PATENT AND TRADEMARK OFFICE
CERTIFICATE OF CORRECTION

PATENT NO. : 5,135,141

DATED : August 4, 1992

INVENTOR(S) : Roland Harmer, et al.

It is certified that error appears in the above-identified patent and that said Letters Patent is hereby corrected as shown below:

On the Title page, item ]57]
    In the Abstract, line 2:  "and bonded"  should read as --and mechanically bonded--

In the Abstract, line 10:  "a bond"  should read as --a mechanical bond--

Column 5, line 16:  after "garments" insert --.--

Signed and Sealed this

Twenty-eighth Day of September, 1993

*Attest:*

BRUCE LEHMAN

*Attesting Officer*    *Commissioner of Patents and Trademarks*